United States Patent [19]

Kump et al.

[11] Patent Number: 4,851,305

[45] Date of Patent: Jul. 25, 1989

[54] COVER ASSEMBLIES FOR ELECTRIC STORAGE BATTERIES AND BATTERIES UTILIZING SUCH COVER ASSEMBLIES

[75] Inventors: William H. Kump, St. Paul; Richard M. Sahli, Cottage Grove, both of Minn.

[73] Assignee: GNB Incorporated, Mendota Heights, Minn.

[21] Appl. No.: 157,688

[22] Filed: Feb. 18, 1988

[51] Int. Cl.$^4$ .................... H01M 2/08; H01M 2/12
[52] U.S. Cl. .................................. 429/84; 429/89; 429/175
[58] Field of Search ............... 429/84, 89, 175

[56] References Cited

U.S. PATENT DOCUMENTS

| | | |
|---|---|---|
| 2,880,261 | 3/1959 | Duncan . |
| 3,879,227 | 4/1975 | Hennen . |
| 4,278,742 | 7/1981 | Oxenreider et al. . |
| 4,306,002 | 12/1981 | Heiser et al. ............... 429/84 |
| 4,409,302 | 11/1983 | Poe ............................... 429/89 X |
| 4,486,516 | 12/1984 | Poe . |

*Primary Examiner*—Stephen J. Kalafut
*Attorney, Agent, or Firm*—Augustus J. Hipp; Keith B. Willhelm

[57] ABSTRACT

A cover assembly for a multicell, lead-acid electric storage battery, which is capable of having each cell independently pressure checked for leaks by using pressure testing equipment having a pressure head tip is provided, which cover assembly comprises a primary cover member and one or more cover piece members sealed to the primary cover member and substantially defines a venting system comprising process holes for communicating with each cell, a trapping chamber communicating with each process hole, the trapping chambers being manifolded into one or more sets, and an exhaust port communicating with each set of manifolded trapping chambers and the ambient; wherein the process holes comprise a cap, an outer opening receiving the cap, an annular step and a first and second barrel in substantially coaxial alignment with the outer opening, and apertures, the annular step providing a surface upon which may be placed the pressure head tip of said pressure testing equipment for independently pressure checking the cell when the cap is removed from said outer opening, and defining an inner opening having a diameter less than those of the outer opening and the first barrel and for providing the exclusive means for gaseous communication and electrolyte drainage between the cell and the interior of the first barrel, the first and second barrels generally extending around and between the annular step and the outer opening, the second barrel being disposed generally concentrically around the first barrel, and the apertures providing means for gaseous communication and electrolyte drainage between the trapping chamber and the interior of the first barrel.

20 Claims, 3 Drawing Sheets

COVER ASSEMBLIES FOR ELECTRIC STORAGE BATTERIES AND BATTERIES UTILIZING SUCH COVER ASSEMBLIES

TECHNICAL FIELD

The present invention relates to electric storage batteries and, more specifically, to cover assemblies for wet lead-acid electric storage batteries and to batteries utilizing such cover assemblies.

BACKGROUND OF THE INVENTION

Typically wet (or "flooded electrolyte") lead-acid batteries have a rectangular shaped container onto which a cover assembly is sealed. Both parts usually are made of an injected molded thermoplastic polymer, such as polypropylene. The interior of the battery generally is divided by partition walls into cells, each of which contains an electrode stack. Once the cover assembly is sealed to the container, the cells are filled with electrolyte, typically through process holes in the cover assembly which are associated with each cell. The electrode stacks are electrically connected in series by intercell connections usually extending through the partition walls.

It is important to form the partition walls and intercell connectors so that the cells provide a leak-proof receptacle for electrolyte. That is, if electrolyte seepage occurs between the cells, by whatever route, an electrical circuit might be completed —the cells "self-discharge" or "short circuit". This phenomenon can lead to loss of charge and premature failure of the battery. Despite the general efficacy of modern manufacturing techniques, leak-proof cells are not always formed. Accordingly, it is important to test the battery once the intercell connectors have been formed and the cover sealed to ensure that leaks do not exist between the cells.

A common technique is to "pressure check" each individual cell. In essence, it is a simple procedure. The test equipment commonly employed comprises a cup-like pressure head tip which may be placed over the uncapped process holes in an airtight fashion. Air is pumped into the cell through the cup, and the air pressure is monitored for a period of time.

Wet batteries also must comprise some means by which gas generated during charging, predominately hydrogen and oxygen, are vented to the ambient. Hydrogen and oxygen gas create an obvious potential for explosion; and, thus, the battery's venting system should permit substantially complete evacuation of generated gases.

In wet batteries, there are large quantities of free electrolyte in the cell, which can slosh and splash about the interior of the battery during shipment, installation, and use of the battery. The venting system, therefore, not only must allow gases to vent, but it also must prevent electrolyte from escaping from the battery.

One popular type of venting system generally comprises internal apertures, trapping chambers, and external exhaust ports associated with each cell. Gases generated within the battery vent through one or more internal apertures into the trapping chamber. The trapping chamber is provided with a variety of baffles and internal restrictions designed to prevent electrolyte from escaping through the trapping chamber and to condense and collect electrolyte mist and vapor. Trapping chambers also typically include sloping floors and sumps designed to reflux trapped electrolyte back through the internal apertures to the cells. The internally generated gases, stripped of entrained electrolyte, eventually pass to the ambient through the exhaust port.

The trapping chambers associated with each cell often are manifolded, most frequently in sets of three or six, so as to share common exhaust ports. This not only provides a simpler design and reduces the number of flame arrestors needed, a common element associated with each exhaust port, but provides for more efficient electrolyte collection. Thus, especially for the remote cells in the manifolded system, entrained or flowing electrolyte simply has much farther to go before it can "escape" the system.

Such venting systems, however, necessitate the use of a multiple component cover assembly, i.e., a primary cover which is sealed to the battery container and one or more additional cover pieces which are sealed to the primary cover to complete the formation of the venting system. Preferably, the cover pieces are sealed to the primary cover before the primary cover is sealed to the container. That preference becomes clear in light of conditions existing in the modern battery industry.

Because lead is both very heavy and a major component of lead-acid batteries, it is necessary to maintain a large number of battery assembly facilities each supplying a relatively limited distribution/consumer area in order to keep shipping expenses within reason. A single plastics molding plant, however, can efficiently and economically provide many battery assembly plants with containers, covers, and other thermoplastic battery components. Indeed, it is more efficient to complete the cover assembly in the plastics molding plant because this avoids the need to install specialized machinery for completing the cover assembly in each battery assembly plant. It also is preferable to minimize the amount of sealing done in the battery assembly plants because sulfuric acid electrolyte permeates those facilities and everything in them and can interfere with the sealing process, making such processes less efficient.

In summary, therefore, there are a number of needs which preferably are satisfied by wet, lead-acid storage batteries and/or their venting systems: (1) capacity for pressure checking individual cells; (2) manifolding of trapping chambers so as to improve the efficiency of the venting system; and (3) completion of the cover assembly before it is sealed to the container. Unfortunately, prior art designs have not succeeded in satisfying all of those needs by a single design.

So-called "gang vent plugs" sometimes are used to vent gases, and it may be possible to pressure check individual cells in a battery which utilizes gang vent plugs. If properly designed, gang vent plugs also may provide acceptable venting and electrolyte separation efficiency. Such gang vent plugs also can be completely assembled before the primary cover is sealed to the battery container. Electrolyte leakage, however, can be a problem.

Gang vent plugs "plug" into the process holes through which the battery is filled with electrolyte. That is, they are adapted to cap several, usually three or six, of the process holes. Unfortunately, the tolerances required in manufacturing gang vent plugs are close and can be difficult to coordinate.

Such tolerances must be built into the mold to allow for shrinking of the plastic during the molding process. In gang vent plugs, the manufacturer must provide tolerances not only between the diameters of the plugs and the process holes, but also in the alignment of the centers of the plugs and process holes —both in the context of a relatively long piece of plastic. Building such tolerances into a gang vent plug is difficult, and can result in the formation of a less than effective seal in one or more of the process holes. For that reason, gang vent plugs provide an incomplete solution to these problems facing the industry.

On the other hand, batteries such as those disclosed in U.S. Pat. No. 4,486,516 to D. Poe and U.S. Pat. No. 4,278,742 to T. Oxenreider et al. have individual process hole caps, which can be more reliably molded, and those batteries also have manifolded trapping chambers. Pressure checking individual cells in such batteries by conventional equipment, however, is not possible regardless of whether the cover assembly, or only the primary cover, is sealed to the container prior to testing.

It is an object of the present invention, therefore, to provide a cover assembly for a wet battery which comprises a manifolded venting system, wherein the components of the cover assembly can be sealed together before the assembled cover is sealed to the battery, and wherein the cells of the battery can be individually pressure checked as well.

It is also an object of this invention to provide a battery, and a cover assembly for such a battery, that includes a venting system which efficiently vents gases and separates electrolyte, but which is more easily manufactured and does not interfere with pressure checking of individual cells of the battery.

Another object is to provide a battery wherein the process holes are more efficiently capped.

Finally, it is another object of the subject invention to provide a battery wherein all of the above advantages are realized.

Those and other objects will become apparent to those of ordinary skill in the art upon inspection of the drawings and reading of the description which follows.

SUMMARY OF THE INVENTION

The present invention provides for a cover assembly for a multicell, lead-acid electric storage battery which is capable of having each cell independently pressure checked for leaks by using pressure testing equipment having a pressure head tip. In accordance therewith, the cover assembly comprises a primary cover member and one or more cover piece members sealed to the primary cover member and substantially defines a venting system comprising process holes for communicating with each cell, a trapping chamber communicating with each process hole, the trapping chambers being manifolded into one or more sets, and an exhaust port communicating with each set of manifolded trapping chambers and the ambient. The process holes, further in accordance with the subject invention, comprise an outer opening receiving one of the caps, an annular step and a first and second barrel in substantially coaxial alignment with the outer opening, and apertures. The annular step provides a surface upon which may be placed the pressure head tip of the pressure testing equipment for independently pressure checking the cell when the cap is removed from the outer opening and defines an inner opening having a diameter less than those of the outer opening and the first barrel and for providing the exclusive means for gaseous communication and electrolyte drainage between the cell and the interior of the first barrel. The first and second barrels generally extend around and between the annular step and the outer opening, the second barrel being disposed generally concentrically around the first barrel, and the apertures provide means for gaseous communication and electrolyte drainage between the trapping chamber and the interior of the first barrel.

It will be appreciated from the detailed description which follows that a process hole comprising the annular step and barrels, as has been briefly described hereinbefore, may function as an integral component of an efficient, manifolded venting system. Moreover, the cover assembly which defines the venting system can be completed before it is sealed to the battery container, and yet, the process holes will permit individual testing of each cell for leaks.

Those and other features and advantages, the manner of making and using the subject invention, and the inventors' best mode thereof will be more apparent to those skilled in the art upon reading the following detailed description and upon reference to the drawings.

DETAILED DESCRIPTION OF THE INVENTION

Figure 1:
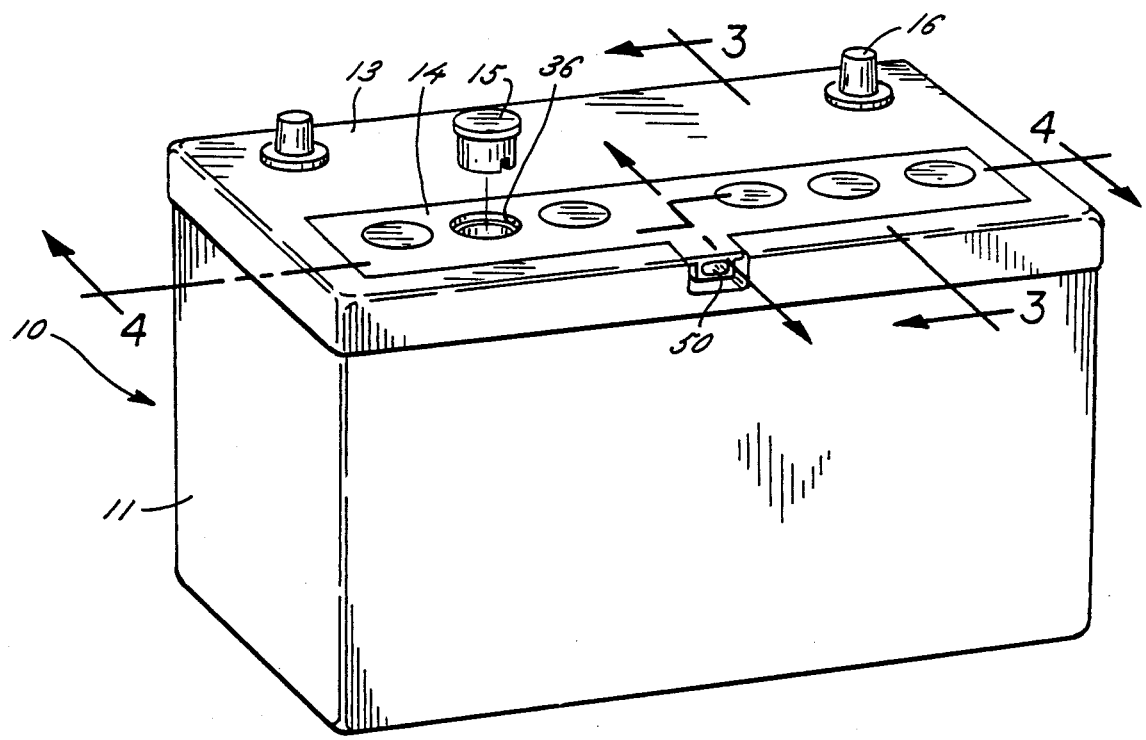
FIG. 1 is a perspective view of a preferred embodiment of a battery including the cover assembly of the subject invention.
Figure 2:
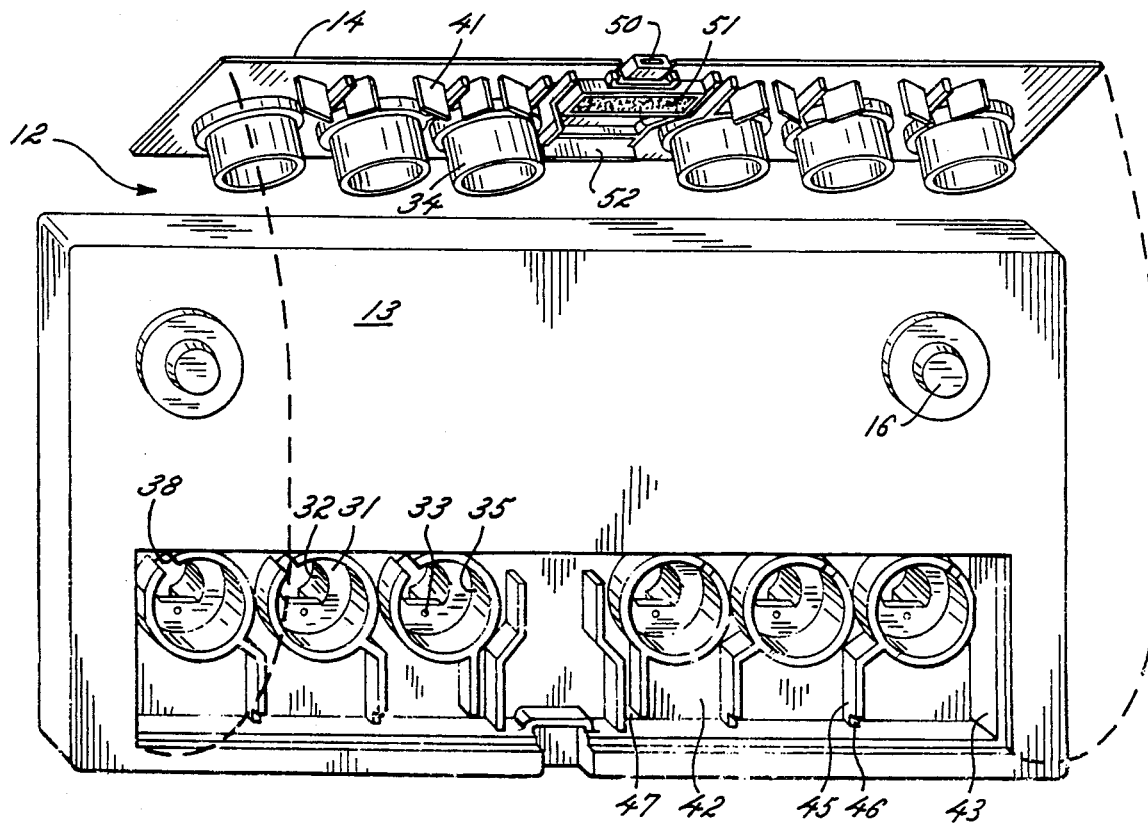
FIG. 2 is an exploded perspective view of the battery cover assembly 12 showing details of the venting system.
Figure 3:
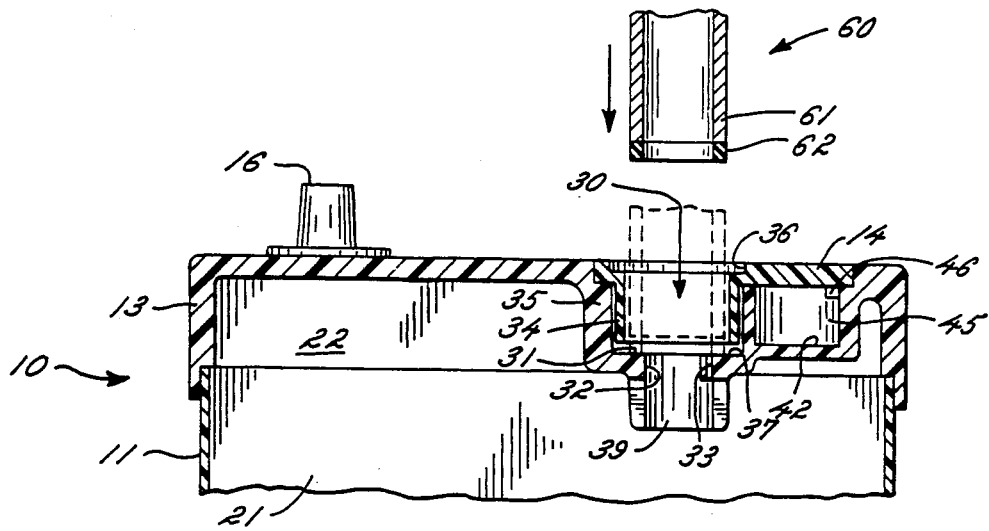
FIG. 3 is a cross-sectional view, taken generally along line 3—3 of FIG. 1, of the battery shown in FIG. 1, the baffles 41 being omitted for the sake of clarity, wherein the process hole 30 is uncapped to show the manner in which the tip 60 of conventional pressure checking equipment may be inserted into the process hole 30.
Figure 4:
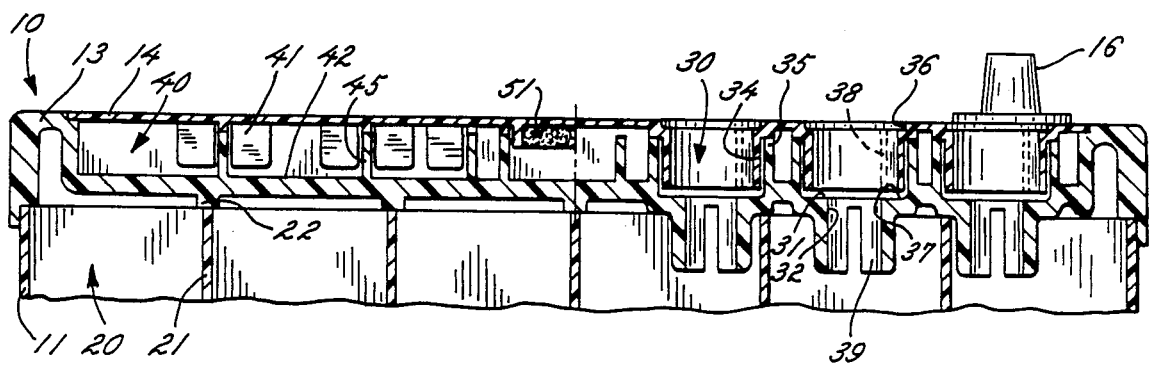
FIG. 4 is a cross-sectional view, taken generally along line 4—4 of FIG. 1, of the (uncapped) battery shown in FIG. 1 and showing certain details of the venting system.

FIGS. 1–7 illustrate a preferred embodiment of the storage battery of the subject invention. The battery 10, as shown in FIG. 1, is constructed of a generally rectangular shaped container 11 to which is sealed a cover assembly 12. The cover assembly 12 comprises a primary cover member 13 and a cover piece member 14. Process holes, shown generally by the numeral 30, pass through the cover assembly 12 and are sealed by caps 15. Mounted in, and extending through, the cover assembly 12 are a pair of terminals 16. The interior of the battery is divided into cells 20, as best seen in FIG. 4, which cells 20 are defined in part by partition walls 21 depending from the battery container 11 and abutting partition walls 22 depending from the primary cover member 13.

The container 11, the various parts of the cover assembly 12, and the caps 15 may be formed from a variety of conventional materials by a variety of conventional techniques. For example, they may be formed of a thermoplastic polymer, such as polyethylene, polypropylene and their co-polymers, by injection molding techniques. Likewise, any of several known techniques may be used to seal the parts, e.g., heat sealing with or without adhesives, adhesives alone, or solvents. Various cooperating steps, grooves, and guides may be provided in adjacent pieces of the battery in order to facilitate assembly and sealing, as is well known in the art, although for the sake of clarity such features generally are omitted from the figures. Also, the cover assembly 12 preferably is completely assembled, i.e., the primary cover member 13 and cover piece member 14 are sealed together before the cover assembly 12 is sealed to the container 11.

As best seen in FIGS. 2–4, the battery 10 is provided with a venting system which comprises the process holes 30, trapping chambers 40, and an exhaust port 50. Preferably, the venting system is substantially defined in the cover assembly 12.

Thus, various elements of the venting system and its components will be exemplified herein as a part of either the primary cover member 13 or the cover piece member 14. It generally is not necessary, however, that any particular element of the venting system or its components be molded initially as a part of one or the other, or indeed, of either the primary cover member 13 or cover piece member 14. Multiple cover pieces and the like may be used in the cover assembly 12. Similarly, the various elements of the venting system frequently may be described as if they were separate parts, but it will be appreciated that in general they may be integrally formed with other "parts".

The process holes are shown generally as element 30, their subelements being identified by additional reference numerals. There is a process hole 30 associated with each cell 20 to provide an opening through which the battery 10 may be filled with electrolyte as may be seen from FIGS. 1–4. In accordance with the subject invention and as described in greater detail hereinafter, the process holes 30 also are an integral component of the venting system for the battery 10, and provide the exclusive means by which gases from the interior of the battery 10 may communicate with the rest of the venting system and the ambient. Moreover, such process holes 30 are adapted to seat the pressure head tip 60 of conventional pressure testing equipment, thereby permitting pressure checking of individual cells 20. That, and other benefits of the subject invention will be discussed in greater detail below, after the following, more specific description of the process holes 30.

That is, as can be seen in FIGS. 2–4, the process holes 30 comprise an annular step 31. The annular step 31 defines an inner opening 32, and preferably, there also is a smaller, air-bleed hole 33 passing through the annular step 31 closely adjacent the inner opening 32. This air-bleed hole 33 permits gases to escape from the cell 20 as electrolyte is poured into the cell 20 through the process hole 30. Although the filling process is facilitated thereby, it is not necessary, however, to provide the air-bleed hole 33.

The inner opening 32 and, if present, the air-bleed hole 33 provide the exclusive means by which gases may pass into the venting system, and more specifically, into the interior of a first barrel-shaped structure 34.

The first barrel 34 in turn is generally surrounded by a second barrel-shaped structure 35. Both barrels 34, 35 are disposed generally between the annular step 31 and the outer opening 36 of the process hole 30. They extend substantially continuously through the trapping chamber 40, except for apertures 37 (an annular slot) and 38 (a vertical slot) through which gases may pass into, and electrolyte may reflux from, the trapping chamber 40.

The barrels 34, 35 and the apertures 37, 38 define the first part of a tortuous and restricted path leading from the openings 32, 33, into the trapping chamber 40, and eventually through an exhaust port 50, along which gases may pass relatively easily, but from which electrolyte is restricted. The barrels 34, 35 and apertures 37, 38 cooperate together and, as will be seen, with the trapping chamber 40 to "trap" the electrolyte, i.e., they tend to prevent the flow of large quantities of electrolyte into the trapping chamber 40, to condense electrolyte entrained in the venting gases, and to reflux the electrolyte back toward the openings 32, 33. It should be noted, however, that it is not essential for the air-bleed hole 33 to be sized sufficiently large to permit easy drainage of electrolyte therethrough, the inner opening 32 being more than adequate for such purposes.

While the barrels 34, 35 and apertures 37, 38 are preferred because applicants have found that they contribute to the excellent performance of the venting system described herein as a preferred embodiment, it will be appreciated that other baffle-like structures may be used. The term "barrel" when applied to other baffle-like structures may be a misnomer, for such "barrels" may be elliptically or polygonally shaped.

Likewise, the apertures 37, 38 may be of different shapes and may be located in other areas of the barrels. The apertures may be circular holes, for example, or there may be multiple apertures in each barrel adapted specially for either draining, venting, or draining and venting purposes. The precise configuration of the barrels and apertures is not critical to the subject invention so long as they provide for venting of gases and trapping of electrolyte substantially as described above.

As shown in FIG. 1, the external opening 36 of the process holes 30 are sealed with caps 15 when the battery is in service. The caps 15 are sized to seal the process holes 30 in such a manner as to prevent the passage of electrolyte around the caps 15 and out of the battery 10.

The caps 15 shown in FIG. 1 are generally disk-shaped with a depending skirt which may be beveled somewhat at its end. Such caps are removable and provide an excellent seal, but it will be appreciated that the caps may be permanently sealed, e.g., by heat sealing, depending on whether the battery is designed to be maintenance-free. Many other well known cap designs may be used in the subject invention. For example, the caps may be threaded to engage corresponding threads provided in the process hole or several caps can be joined in an integral piece. Preferably, however, the caps are molded in separate pieces so as to avoid manufacturing problems similar to those experienced with gang vent plugs.

The size of the various elements of the process holes is coordinated as follows. When uncapped, the process holes 30 should provide a passageway into which the nozzle of conventional electrolyte filling machinery may be inserted. The external opening 36, the barrel 34, and the inner opening 32, therefore, all are substantially coaxially aligned and are sized to accommodate an electrolyte filling nozzle. The external opening 36 and barrel 34 also are sized to accommodate the insertion of the pressure head tip 60 of conventional pressure testing equipment.

In accordance with the subject invention and as best seen in FIG. 3, the diameter of the internal opening 32, however, is less than that of the first barrel 34 and the external opening 36, such that it will not accommodate the passage of the pressure head tip 60. The annular step 31, therefore, is exposed and provides a shoulder or seat upon which the pressure head 60 may rest, as shown in phantom in FIG. 3.

Typically, the electrolyte nozzles are substantially cylindrical and are from about 0.200 to about 0.400" in diameter. As shown in FIG. 3, the pressure head tip 60 common to many conventional testers comprises a hollow metal cylinder 61 having an annular elastic, e.g., rubber end 61 and generally has an outer diameter of from about 0.5 to about 0.750". The diameter of the outer opening 36, first barrel 34, and inner opening 32 are adapted and coordinated therewith, or more precisely, with the dimensions of the equipment with which it is contemplated the battery will be filled and tested. Although some tolerance obviously is desirable, there generally is no benefit in making the barrel 34 and the outer opening 36 significantly larger than is required to accommodate the contemplated filling and testing equipment. Similarly, it is not necessary that the openings 32, 36 and the barrel 34 be exactly coaxially aligned so long as the process hole 30 has the capability to accommodate the electrolyte nozzle and to seat the pressure head 60 on the annular step 31.

It will be appreciated that when the pressure head 60 engages the annular step 31, as shown in phantom in FIG. 3, its outer diameter surrounds both the inner opening 32 and the air-bleed hole 33, the air-bleed hole 33 being situated closely adjacent to the inner opening 31 with that purpose in mind. For purposes of the subject invention, however, it is not necessary that the air-bleed hole 33 also be situated within the inner diameter of the pressure head tip 60 so long as an effective seal is created between the inner opening 32 and air-bleed hole 33 and the trapping chamber 40. Thus, the cell 20 may be pressurized through the inner opening 32 and, if not covered by the walls of the pressure head tip 60, the air-bleed hole 33. Moreover, the openings 32, 33 being the only means by which gas may flow out of the cell 20, therefore, pressure may be built up in the cell 20, and it may be checked for leaks independently of any other cells 20.

Importantly, it should be appreciated that the pressure checking can take place after the cover assembly 12 is completely assembled, except of course for insertion of the caps 15. The cover assembly 12, therefore, can be assembled in the plastics molding plant before it is sealed to the container. Moreover, the manifolding of the trapping chambers 40, which now will be described in greater detail, does not prevent the pressure checking of individual cells 20 because the pressure seal for such pressure checking is located "below" the trapping chambers 40.

More specifically, in the absence of the annular step 31, once the completed cover assembly 12 is sealed to the container 11, there would be no surface below the trapping chamber 40 upon which the pressure head tip 60 could be seated. If pressure head tips 60 were placed over the process holes 30 on the top surface of the cover assembly 12, air communicating through the manifolded trapping chambers 40 would make it impossible, if a leak were detected, to ascertain the cell 20 in which the leak existed. Without the annular step 31, individual cells 20 perhaps could be pressure checked, but that would require sealing the cover piece member 14 to the primary cover member 13 after the primary cover member 14 had been sealed to the container 11. It also can be appreciated that it is possible to obtain the important benefits just described without encountering the difficulties associated with manufacturing gang vent plugs if separately molded caps are used.

As noted above, a trapping chamber 40 communicates with each cell 20 through the process hole 30. The trapping chamber 40 is designed to perform a number of functions. Obviously, it must permit gases to vent through it and ultimately to the ambient. It also must collect, condense, or otherwise "trap" gas-entrained electrolyte and reflux the collected electrolyte back into the cells 20. Accordingly, trapping chambers, reduced to their essence, preferably utilize a variety of baffles, restrictions, inclined floors, and/or sumps to define a long and tortuous path over which venting gases must travel and a drainage system to reflux electrolyte entering the chamber back toward the cells.

The trapping chambers 40, as shown in FIGS. 2-7, therefore, comprise baffles 41 depending from the underside of cover assembly member 14 and, although it may be difficult to appreciate from the drawings alone, the floors 42 of the trapping chamber 40 are inclined so as to encourage the flow of electrolyte into the drain aperture 38 in the second barrel 35 of the process hole 30. It also should be noted that the annular step 31 in a sense is simply a particular region of the trapping chamber floor 42, i.e., the annular step 31 preferably is formed as an integral part of and cooperates with the trapping chamber floor 42. Moreover, as best shown in FIG. 3, the annular step 31 preferably is recessed below the floor 42 of the trapping chamber 40 so as to form a sump to assist drainage of electrolyte back into the cell 20. Similarly, the annular step 31 may be inclined slightly towards the internal opening 32.

It can be seen that the orientation of the process holes 30 themselves relative to the sidewalls 43 of the trapping chamber 40 and to each other define restrictions in the trapping chamber 40 therebetween, e.g., restrictions 44. While the trapping chambers 40 comprise baffles, restrictions, inclined floors, sumps, and the like, and the combination just described provides excellent performance, workers in the art will appreciate that many other combinations may be used. Indeed, the precise selection, coordination, and arrangement of such elements of the trapping chamber form no part of the subject invention.

The individual trapping chambers 40 are substantially separated by partition walls 45 and portions of the second barrel 35 of the process holes 30, as seen, for example, in FIG. 2. There are, however, suitable apertures 46, 47 by which, in accordance with a preferred embodiment of the subject invention, the trapping chambers 40 are manifolded together to share a common exhaust port 50. It will be noted that the manifold apertures 47 extend down to the floor 42 of the trapping chamber 40 so that electrolyte condensing in the area surrounding the exhaust port 50 is permitted to flow back into the trapping chambers 40 and eventually, to the middle two cells 20. All six trapping chambers 40 may be manifolded, as shown in FIGS. 1-7, but it will be appreciated that not all of the trapping chambers 40 must be manifolded together. For example, two sets of three manifolded trapping chambers may be provided.

Figure 5:
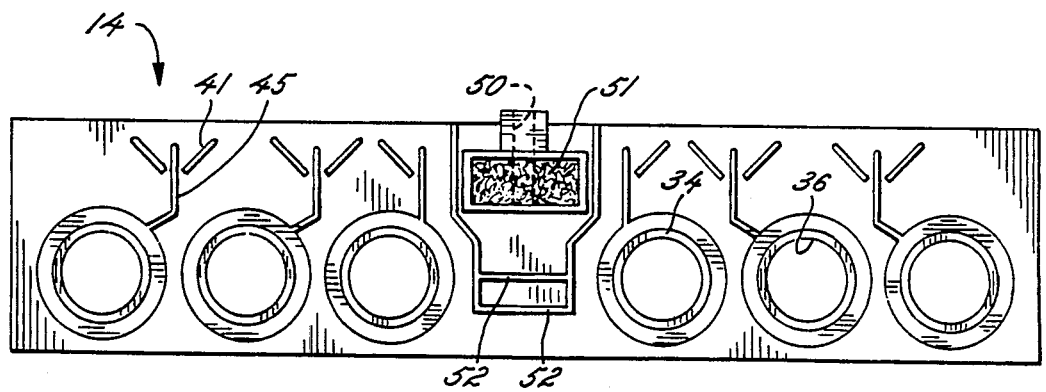
FIG. 5 is a bottom plan view of the cover piece member 14 of the battery shown in FIG. 1 and further illustrates the venting system of the battery.
Figure 6:
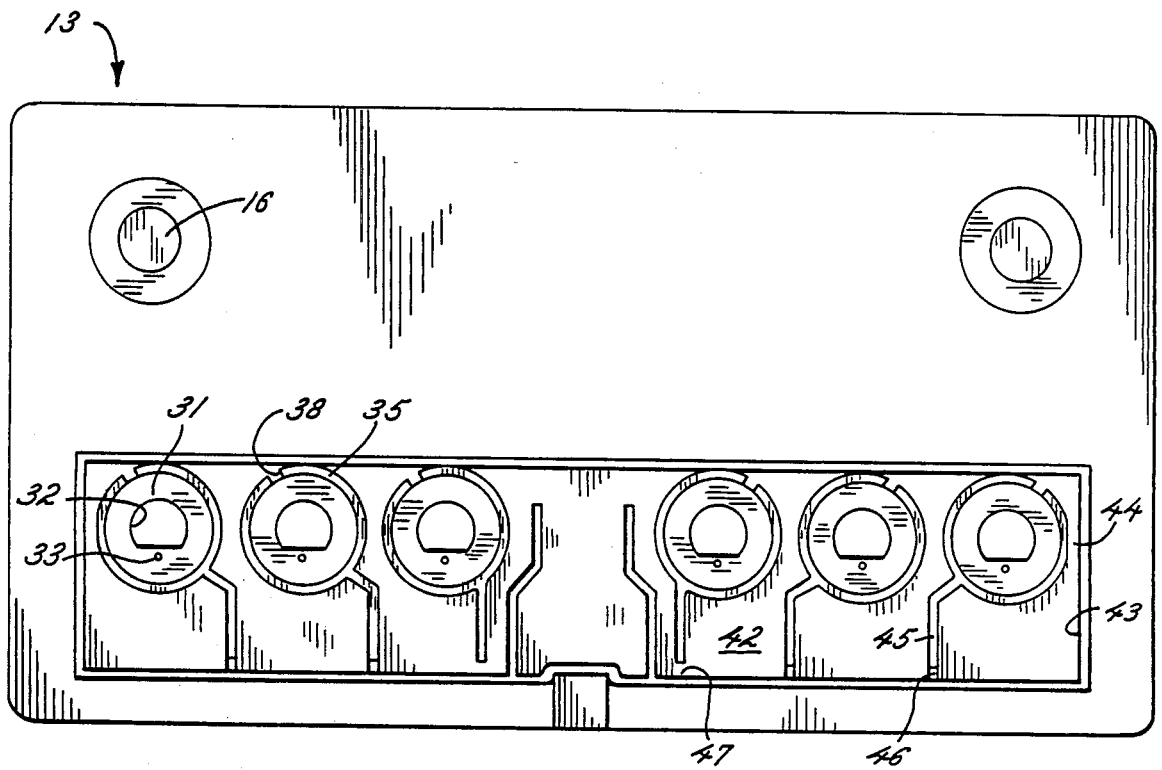
FIG. 6 is a top plan view of the battery shown in FIG. 1, wherein the cover piece member 14 is removed to show details of the venting system.

It is also will be noted from FIGS. 2 and 4-5 that the venting system preferably includes a flame arrestor 51 associated with each exhaust port 50. The flame arrestor 51 is of conventional composition, e.g., microporous polypropylene. It may be mounted on the undersurface of cover piece member 14 and covers the exhaust port 50. Various baffles 52 also may be disposed in the vicinity of the exhaust port 50 to enhance the overall efficiency of the venting system. Further, in regard to the overall efficiency of the venting system, it will be appreciated that the process holes described herein and the manifolded trapping chambers cooperate to provide excellent venting/trapping performance.

Figure 7:
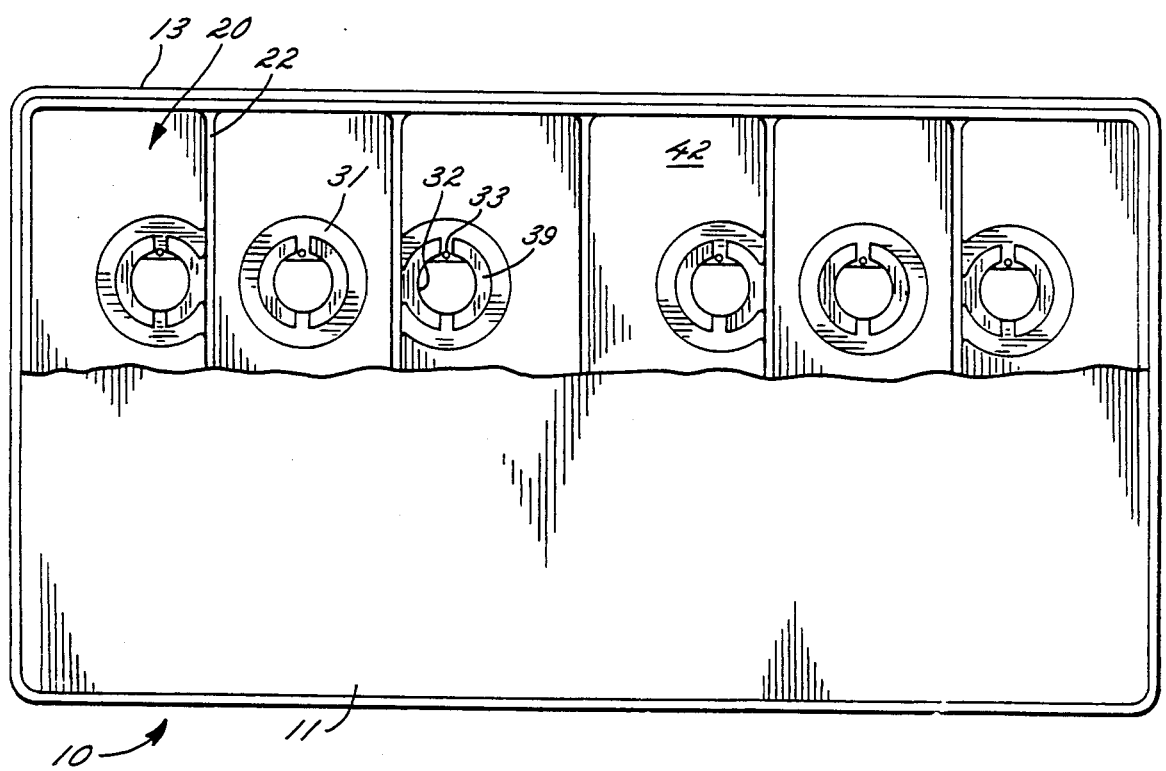
FIG. 7 is a bottom plan view of the (uncapped) battery shown in FIG. 1, wherein portions of the container 11 are broken away to show a partial bottom plan view of the primary cover member 13.

In accordance with another preferred aspect of the subject invention, a skirt-like structure 39 extends downward from the annular step 31 into the interior of the cells 20 as shown in FIGS. 3-4 and 7. The skirts 39 can assist in minimizing spraying of electrolyte throughout the interior of the battery 10 during filling, although such skirts are not strictly necessary, especially as the annular step 31 is located further below the floor 42 of the trapping chamber 40 and into the cell 20. The skirts 39 shown in FIGS. 3-4 and 7 comprise two semicircular structures defining slots therebetween; but, if present, it should be appreciated that many other well-known designs may be used consistent with the purpose of minimizing electrolyte spraying, for example, a single semicircular structure.

While this invention has been disclosed and discussed primarily in terms of specific embodiments thereof, it is not intended to be limited thereto. Other modifications and embodiments will be apparent to the worker in the art.

We claim:

1. A cover assembly for a multicell, lead-acid electric storage battery capable of having each cell independently pressure checked for leaks by using pressure testing equipment having a pressure head tip, which cover assembly comprises a primary cover member and one or more cover piece members sealed to said primary cover member and substantially defines a venting system comprising process holes for communicating with each said cell, a trapping chamber communicating with each said process hole, said trapping chambers being manifolded into one or more sets, and an exhaust port communicating with each said set of manifolded trapping chambers and the ambient; wherein said process holes comprise a cap, an outer opening receiving said cap, an annular step and a first and second barrel in substantially coaxial alignment with said outer opening, and apertures, said annular step providing a surface upon which may be placed said pressure head tip of said pressure testing equipment for independently pressure checking said cell when said cap is removed from said outer opening, and defining an inner opening having a diameter less than those of said outer opening and said first barrel and for providing the exclusive means for gaseous communication and electrolyte drainage between said cell and the interior of said first barrel, said first and second barrels generally extending around and between said annular step and said outer opening, said second barrel being disposed generally concentrically around said first barrel, and said apertures providing means for gaseous communication and electrolyte drainage between said trapping chamber and the interior of said first barrel.

2. The cover assembly of claim 1, wherein said annular step is provided with an air-bleed hole closely adjacent to said inner opening, said inner opening and said air-bleed hole for providing the exclusive means for gaseous communication and electrolyte drainage between said cell and the interior of said first barrel.

3. The cover assembly of claim 1, wherein said annular step is recessed below the floor of said trapping chamber.

4. The cover assembly of claim 2, wherein said annular step is recessed below the floor of said trapping chamber.

5. The cover assembly of claim 1, wherein said process holes comprise a skirt extending downward from said annular step.

6. The cover assembly of claim 2, wherein said process holes comprise a skirt extending downward from said annular step.

7. The cover assembly of claim 3, wherein said process holes comprise a skirt extending downward from said annular step.

8. The cover assembly of claim 4, wherein said process holes comprise a skirt extending downward from said annular step.

9. The cover assembly of claim 1, wherein said battery comprises six cells and said trapping chambers are manifolded into a single set of six manifolded trapping chambers.

10. The cover assembly of claim 2, wherein said battery comprises six cells and said trapping chambers are manifolded into a single set of six manifolded trapping chambers.

11. The cover assembly of claim 3, wherein said battery comprises six cells and said trapping chambers are manifolded into a single set of six manifolded trapping chambers.

12. The cover assembly of claim 4, wherein said battery comprises six cells and said trapping chambers are manifolded into a single set of six manifolded trapping chambers.

13. The cover assembly of claim 5, wherein said battery comprises six cells and said trapping chambers are manifolded into a single set of six manifolded trapping chambers.

14. The cover assembly of claim 6, wherein said battery comprises six cells and said trapping chambers are manifolded into a single set of six manifolded trapping chambers.

15. The cover assembly of claim 7, wherein said battery comprises six cells and said trapping chambers are manifolded into a single set of six manifolded trapping chambers.

16. The cover assembly of claim 8, wherein said battery comprises six cells and said trapping chambers are manifolded into a single set of six manifolded trapping chambers.

17. A battery comprising the cover assembly of claim 1.

18. A battery comprising the cover assembly of claim 2.

19. A battery comprising the cover assembly of claim 3.

20. A battery comprising the cover assembly of claim 4.

* * * * *

Disclaimer and Dedication

4,851,305—*William H. Kump*, St. Paul; *Richard M. Sahli*, Cottage Grove, both of Minn., COVER ASSEMBLIES FOR ELECTRIC STORAGE BATTERIES AND BATTERIES UTILIZING SUCH COVER ASSEMBLIES. Patent dated July 25, 1989. Disclaimer and Dedication filed June 7, 1990, by the assignee, GNB Inc.

Hereby disclaims and dedicates to the Public the remaining term of said patent.
[*Official Gazette February 18, 1992*]